United States Patent [19]
Briski et al.

[11] Patent Number: 5,432,497
[45] Date of Patent: Jul. 11, 1995

[54] ELECTRONICALLY PROGRAMMABLE GAUGE

[75] Inventors: Tony Briski, Pleasanton, Calif.; Dennsi C. Coleman, Grand Junction, Colo.

[73] Assignee: Paccar Inc., Bellevue, Wash.

[21] Appl. No.: 94,618

[22] Filed: Jul. 20, 1993

[51] Int. Cl.⁶ .................. G08B 19/00; G09F 9/00; H04Q 1/20
[52] U.S. Cl. ................... 340/525; 340/461; 340/825.52; 340/825.83
[58] Field of Search ............ 340/461, 462, 525, 825.5, 340/825.23, 825.83, 825.07, 825.08, 825.17, 825.52, 426

[56] References Cited

U.S. PATENT DOCUMENTS

| | | | |
|---|---|---|---|
| 3,922,909 | 12/1975 | Dixson et al. | 73/115 |
| 4,236,213 | 11/1980 | Richardson | 364/431.04 |
| 4,291,382 | 9/1981 | Full et al. | 364/551 |
| 4,302,814 | 11/1981 | Full et al. | 364/551 |
| 4,309,759 | 1/1982 | Tokuda et al. | 364/431.05 |
| 4,395,624 | 7/1983 | Wartski | 364/424 |
| 4,398,258 | 8/1983 | Naitoh et al. | 364/551 |
| 4,404,648 | 9/1983 | Miyakawa et al. | 364/900 |
| 4,507,706 | 3/1985 | Trexler, Jr. | 340/79 |
| 4,551,801 | 11/1985 | Sokol | 340/684 |
| 4,562,545 | 12/1985 | Hasegawa | 364/431.12 |
| 4,564,916 | 1/1986 | Hori et al. | 340/62 |
| 4,611,193 | 9/1986 | Brüggemann | 340/525 |
| 4,630,043 | 12/1986 | Haubner et al. | 340/461 |
| 4,635,034 | 1/1987 | Tokuyama et al. | 340/441 |
| 4,646,059 | 2/1987 | Iwamoto et al. | 340/461 |
| 4,713,762 | 12/1987 | Igarashi | 340/719 |
| 4,725,838 | 2/1988 | Maschek et al. | 340/870.19 |
| 4,817,040 | 3/1989 | Bodley-Scott | 340/459 |
| 4,862,365 | 8/1989 | Onesti | 340/459 |
| 4,875,041 | 10/1989 | Dannenberg | 340/459 |
| 5,018,087 | 5/1991 | Dannenberg | 364/571.01 |

*Primary Examiner*—Jeffery A. Hofsass
*Assistant Examiner*—Daniel J. Wu
*Attorney, Agent, or Firm*—Flehr, Hohbach, Test, Albritton & Herbert

[57] ABSTRACT

A monitoring system for monitoring a plurality of functions and conditions on a plurality of gauges or display modules. The monitoring system comprises a plurality of sensors (10) each producing a sensor signal in response to sensing of one of a function and a condition; a control device (12) coupled to the plurality of sensors and producing a control signal responsive to each of the sensor signals, the control signal including sensor data information and associate sensor identity information identifying one of the plurality of sensors (10); a plurality of display modules (20) each being programmable and each being coupled to the control device (12); and a plurality of module overlays (58) with one of the plurality of module overlays (58) being coupled to each of the plurality of display modules (20). Each of the plurality of module overlays (58) has module identification means (22) communicating with the display module (20) on which it is mounted to program the display module (20) to be responsive to the control signal when the sensor identity information in the control signal corresponds to the module identification means (22) to cause the display module (20) to display the associated sensor data information.

12 Claims, 4 Drawing Sheets

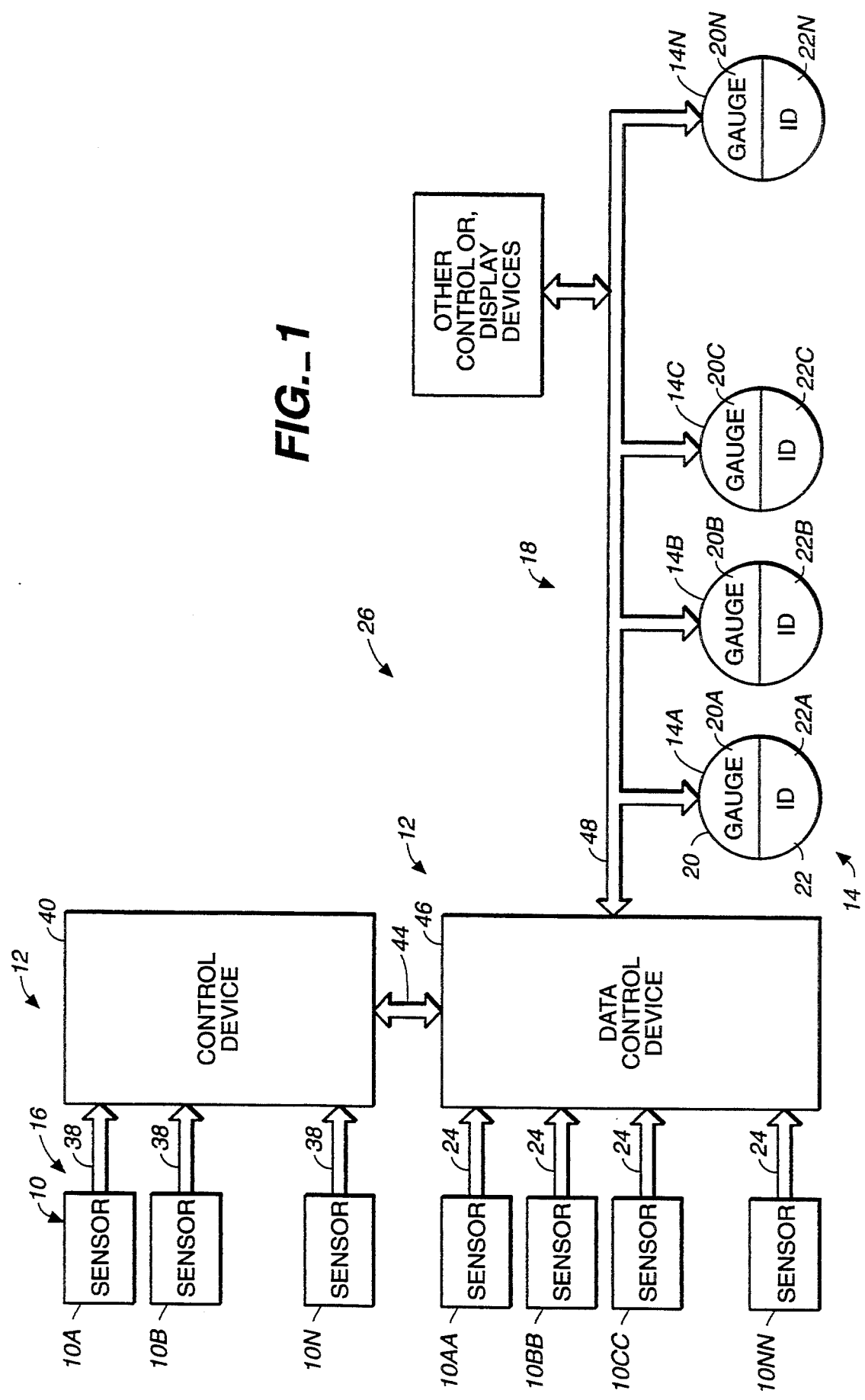
FIG._1

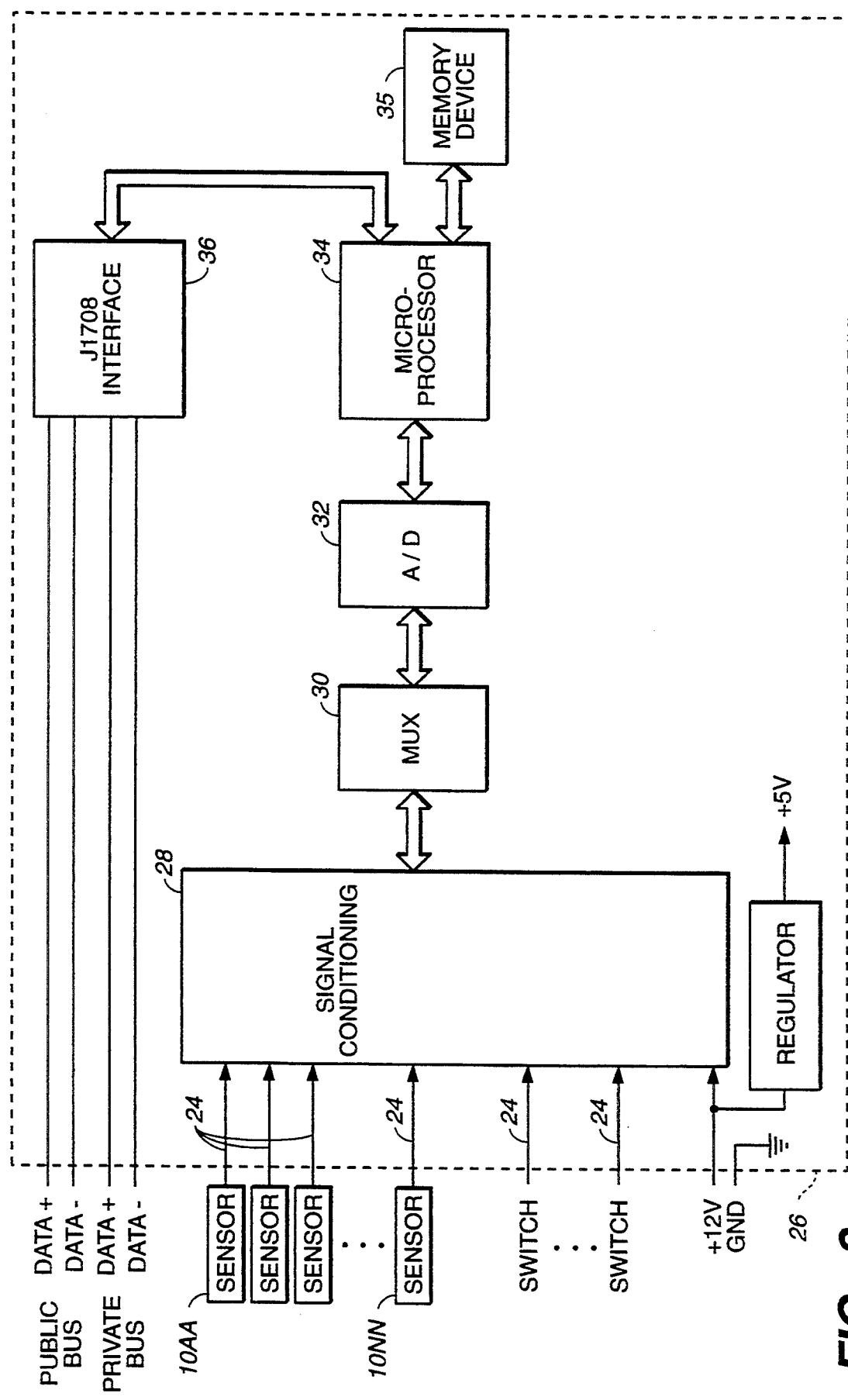
FIG._2

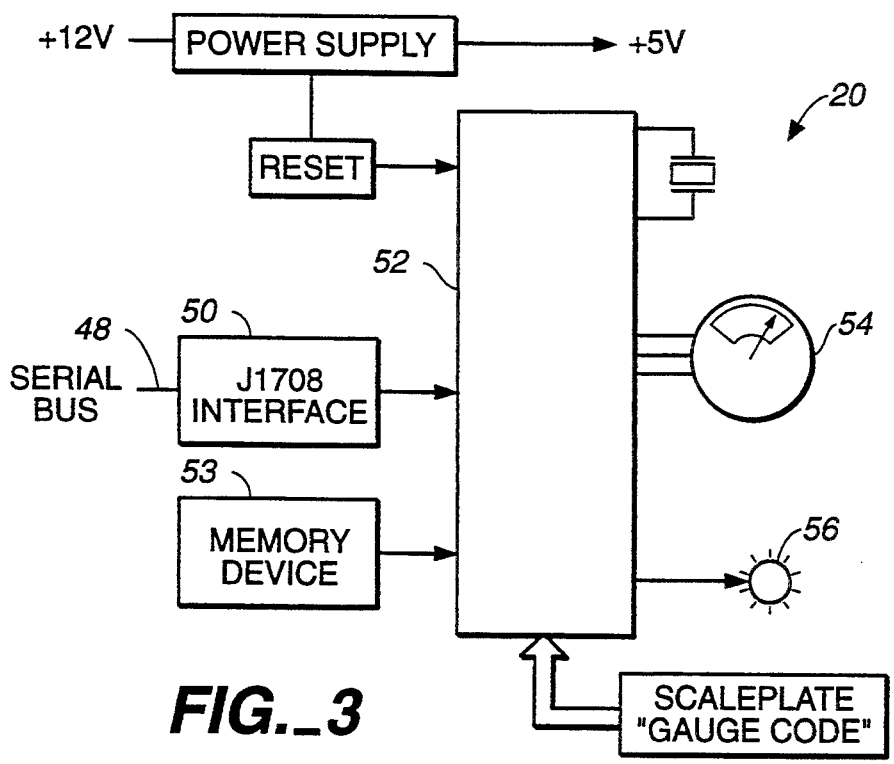
FIG._3
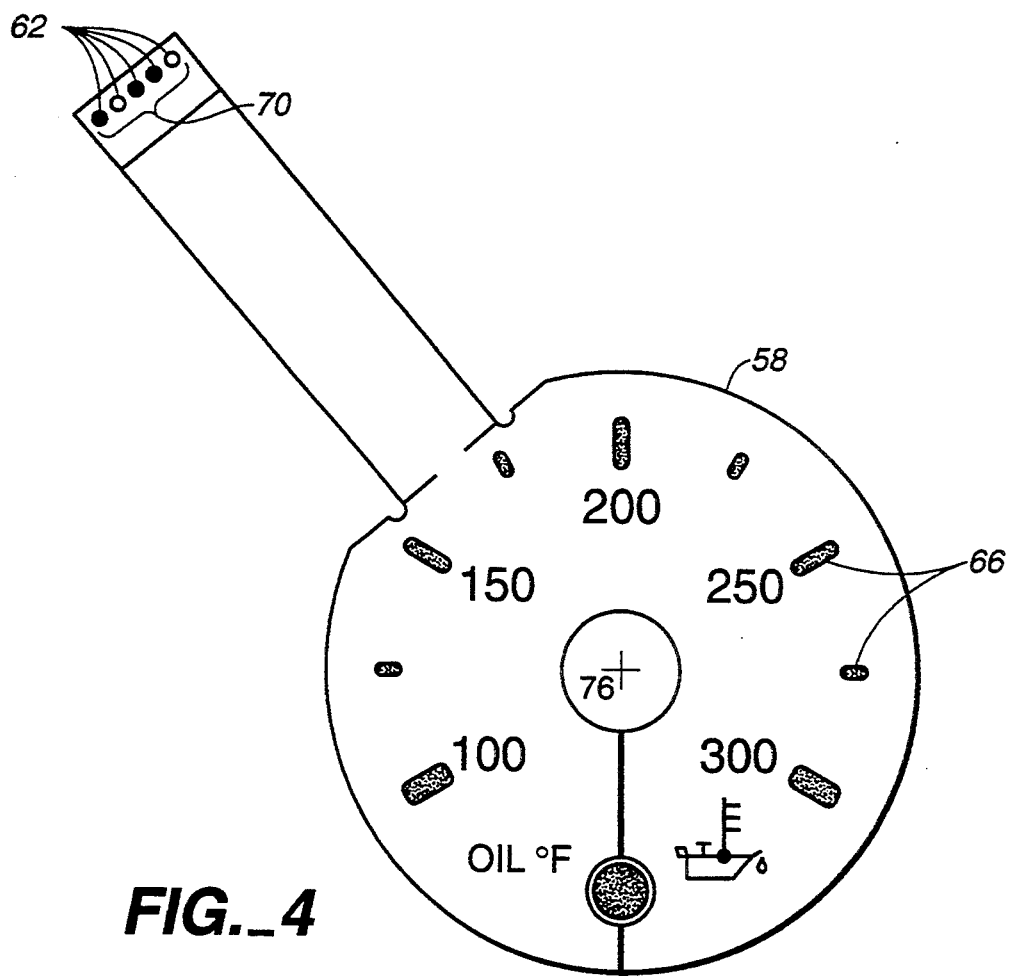
FIG._4

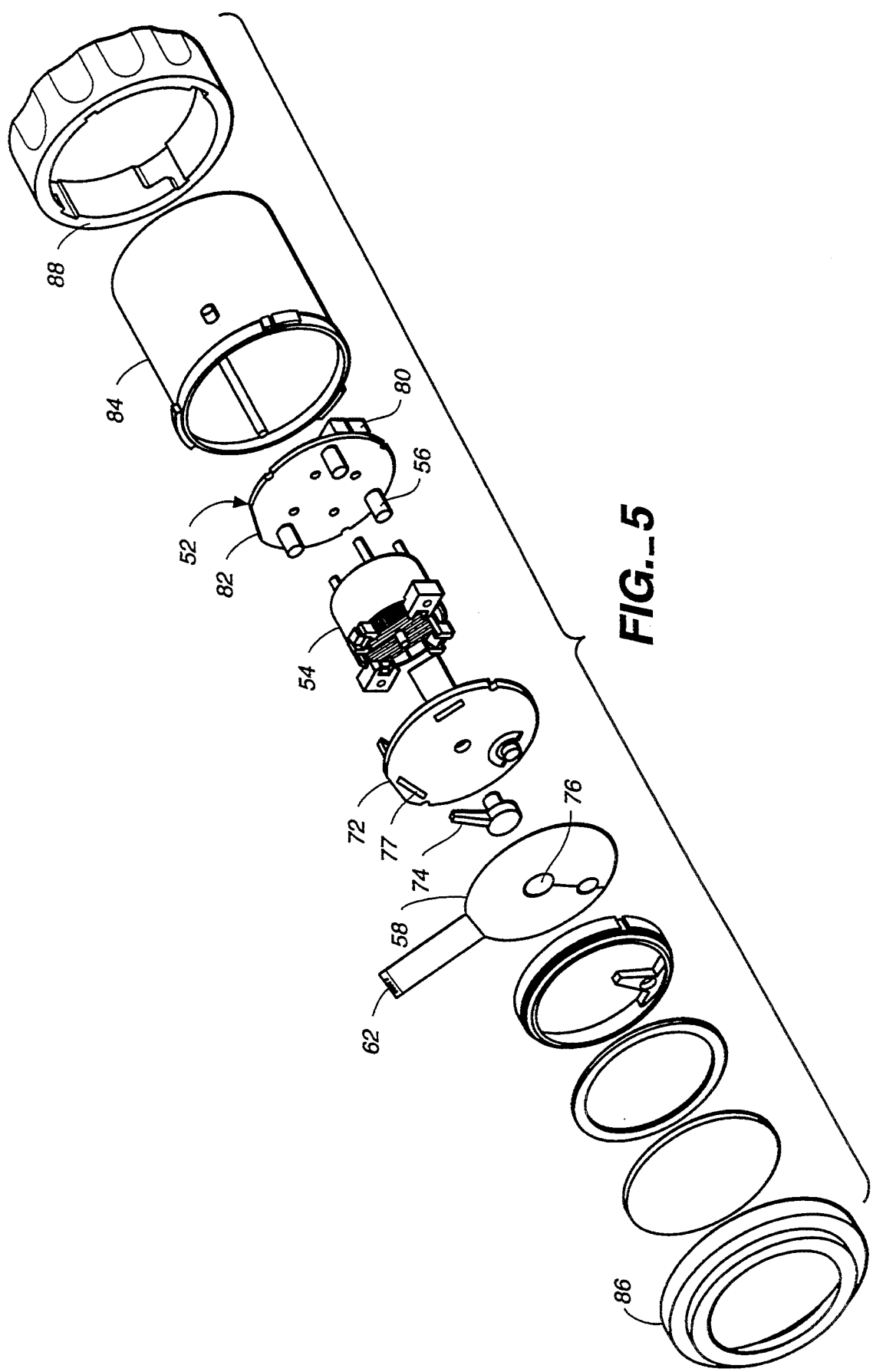
FIG._5

ELECTRONICALLY PROGRAMMABLE GAUGE

TECHNICAL FIELD

This invention relates generally to systems for monitoring functions and conditions of a vehicle as detected by a plurality of sensors, and more particularly, relates to programmable vehicle gauges having identification apparatus which causes the programmable gauge to respond to a particular sensor.

BACKGROUND ART

Presently, most truck operating condition monitoring systems converge behind the dashboard resulting in a kludge of a large number of wires from multiple sources. Typically, a truck dashboard may receive 260 individual wires totalling more than a 1,000 feet of wire. As a result, dashboard assembly, installation, troubleshooting and repair is increasingly difficult. Increasing customer demands for trip recorders, pager systems, satellite communications and the like will further complicate dashboard wiring requirements.

In current truck dashboards, each gauge usually is both dedicated and hardwired to a particular sensor in the truck. So that the fuel level gauge, for example, can only be coupled to the fuel level sensor. As a result, replacement inventories must include each type of dedicated gauge since there is no uniformity among gauges. Further, the fuel level gauge must remain in the same location on the dashboard absent substantial behind the dashboard rewiring.

A solution to the uniformity problem is offered in U.S. Pat. No. 4,551,801 issued Nov. 5, 1985 to Sokol. The gauges comprise identical programmable modules with separate scale plates. Each module is capable of displaying information from up to 16 different sensors to which the module is hardwired. The modules are programmed by input of a sensor identification code by means of either dip switches on the module or an external source. Although the Sokol gauges are not dedicated to a particular sensor which reduces inventory, each module is still hardwired to a particular group of sensors. Thus, the dashboard wiring is still overly complex.

Monitoring gauges and warning lights account for the largest fraction of dashboard wires. In 1994, the majority of truck diesel engines will utilize a programmable electronic control system operating on a standard (J1708/J1939 interface) data bus in order to increase fuel efficiency. During engine operation, the data bus will transmit the function and condition information in order to control engine operation.

None of the current gauge systems is constructed in a manner which would enable one to take advantage of the potential of using the operational information on the data bus of programmable electronic engine control systems. The system and method of the present invention provides a novel, programmable dashboard gauge system and method which takes full advantage of engine control system data buses and effects a very substantial reduction in dashboard wiring complexity. Identical modules are used to display monitoring gauge information and warning light information in response to information received along a standard data bus, which can include the engine control information. A scale plate is mounted to each gauge which identifies the gauge and causes it to display the data on the data bus from a particular sensor.

DISCLOSURE OF THE INVENTION

In accordance with the illustrated preferred embodiment, the present invention provides a system and method for displaying various functions and conditions on a series of identical programmable modules.

It is therefore an object of the present invention to provide identical modules programmable in response to an attached scale plate.

A further object of the present invention is to drastically reduce the number of wires required behind a vehicle dashboard.

Another object of the present invention is to provide vehicle dashboard gauges which are neither hardwired or dedicated to particular sensors.

It is also an object of the present invention to reduce the required inventory of gauges.

A further object of the present invention is to allow easy rearrangement of gauges in the dash by a vehicle owner or mechanic without making any wiring changes.

Additionally, it is an object of the present invention to provide built-in diagnostics for detecting faults in the system.

Another object of the present invention is to provide a dashboard gauge system which displays advanced features at a low-cost.

A final object of the present invention is to provide the aforementioned objects and advantages without altering the manner in which vehicle dashboards are engineered or presented to the user.

The above objects are achieved by employing a monitoring system for monitoring a plurality of functions and conditions on a plurality of gauges or display modules. The monitoring system comprises a plurality of sensors each producing a sensor signal in response to sensing of one of a function and a condition; a control device coupled to the plurality of sensors and producing a control signal responsive to each of the sensor signals, the control signal including sensor data information and associate sensor identity information identifying one of the plurality of sensors; a plurality of display modules each being programmable and each being coupled to the control device; and a plurality of module overlays with one of the plurality of module overlays being coupled to each of the plurality of display modules. Each of the plurality of module overlays has module identification means communicating with the display module on which it is mounted to program the display module to be responsive to the control signal when the sensor identity information in the control signal corresponds to the module identification means to cause the display module to display the associated sensor data information.

BRIEF DESCRIPTION OF THE DRAWINGS

FIG. 1 is a block diagram of the system of the present invention.

FIG. 2 is a block diagram of the chassis interface control device depicted in FIG. 1.

FIG. 3 is a block diagram of the gauge depicted in FIG. 1.

FIG. 4 is a diagram of the scale plate of the present invention.

FIG. 5 is an exploded, top perspective view of the gauge depicted in FIG. 1.

BEST MODE OF CARRYING OUT THE INVENTION

The monitoring system of a preferred embodiment of the present invention is shown in FIG. 1. A vehicle or stationary engine's function and condition data information is sensed by a plurality of sensors, generally designated 10. The sensor data information is processed by a group of control devices, generally designated 12, and then displayed by a plurality of gauges, generally designated 14. The system components communicate along a combination of analog signal lines, generally designated 16, and digital data buses, generally designated 18.

Each gauge 14 is coupled to every sensor 10, however, each gauge 14 is programmed to respond only to a particular sensor 10. That is, when programmed as set forth below, any one of the gauges 14 is capable of displaying the data information from any one of sensors 10. The configuration of data buses 18 and the distributed computing capabilities of gauges 14 enable the interchangeability.

Each gauge 14 consists of a universal module 20 and identification means 22. All universal modules 20 are identical and contain the necessary instructions (i.e., software or firmware) for responding to and displaying the data information from any type of sensor 10. Identification means 22 usually are not identical, since each corresponds to a particular sensor 10. In the preferred embodiment, the identification means 22 is comprised of a group of encoding holes on a scale plate which overlays the front of universal module 20. The encoding holes are not required to be part of the scale plate nor are encoding holes the only type of possible identification means. Alternately, conductive encoding strips, dip switch settings or memory selections on the PCB could be used as identification means.

Universal modules 20 respond to the particular sensor 10 corresponding to the attached identification means 22. Universal modules 20 can respond to different sensors merely by changing identification means 22, since universal modules 20 are identical and each module is coupled to receive data information from all sensors 10 along common data buses 18.

By way of example, sensor 10A may sense oil pressure data, sensor 10B sense oil temperature data, sensor 10C sense engine temperature data and sensor 10nn sense fuel level data. The data from all four of these sensors is transmitted to every gauge 14. Thus, gauge 14A receives oil pressure, oil temperature, engine temperature and fuel level data, as well as data from all other sensors 10. Module 20A allows gauge 14A to display the data from any of sensors 10. The data displayed by gauge 14A depends on identification means 22A which is coupled to module 20A.

Assuming identification means 22A, 22B, 22C and 22nn correspond to sensors 10A, 10B, 10C and 10nn, respectively, gauge 14A will display the oil pressure data collected by sensor 10A. However, the assignment of sensor 10A to gauge 14A is strictly arbitrary. The universal nature of modules 20 enables gauge 14A to display fuel level data merely by replacing identification means 22A on gauge 14A with identification means 22nn. In turn, gauge 14C can display oil pressure data instead of engine temperature data by replacing identification means 22C on module 22C with identification means 22A.

No rewiring or moving of entire gauges is necessary to change the display configuration of the gauges. Additionally, if a vehicle has fifty sensors 10 but room for only 25 gauges 14, the vehicle driver can utilize any of the fifty sensors 10 merely by changing identification means 22 on modules 20. Still further, gauge identification means 22 can identify multiple sensors 10 and cause modules 20 to display data from multiple sensors in sequence. Thus, oil temperature can be displayed at gauge 14A for a fixed period of time, followed by oil pressure, followed by oil temperature again.

Sensors 10A through 10n and 10AA through 10nn preferably gather data corresponding to two types of functions and conditions, engine type data and chassis type data, respectively. Engine sensor data information corresponds to functions and conditions related to the operation of the vehicle engine, such as engine temperature, oil pressure, oil temperature, RPM and the like. Chassis sensor data information corresponds to functions and conditions related to non-engine systems in the vehicle, such as fuel level, brake status, brake saver air pressure and the like. Switches may also be connected along the data buses in a manner similar to sensors 10.

The chassis sensor data information is collected from chassis sensors 10AA through 10nn via chassis signal lines 24 by chassis interface section 26 of data control device 46. FIG. 2 depicts chassis interface section 26 in detail. The chassis sensor signal (carrying chassis sensor data information) from chassis sensors 10AA through 10nn is first conditioned by signal conditioning circuitry 28. The conditioning includes, for example, adjusting the voltage gain of each chassis sensor signal. The conditioned signals are then fed in parallel to multiplexer 30 which outputs the conditioned signals to Analog to Digital (A/D) converter 32 in serial. In turn, A/D converter 32 digitizes the conditioned signals for input to microprocessor 34 which processes the digitized signals for transmission as a chassis control signal downstream to gauges 14. The instructions for processing the digitized signals are contained in memory device 35 which is preferably a ROM or any other suitable form of memory, such as a EEPROM or flash RAM.

One particular processing task of microprocessor 34 is to form the chassis control signal which includes the chassis sensor data information collected by sensors 10AA through 10nn and chassis sensor identity information identifying the sensor from which the chassis sensor data information was collected. Thus, chassis sensor data information and sensor identity information are associated or coupled together so that, for example, gauge 14nn will display fuel level data collected by sensor 10nn if identification means 22nn is coupled to module 20nn.

Transmission of the chassis control signal downstream is facilitated by data bus interface 36. In the preferred embodiment, data bus interface 36 is a standard J1708 interface for transmission on a serial data bus, although it would be apparent to one of ordinary skill in the art that any number of different transmission standards could be used, both serial and parallel.

The engine sensor data information is collected from engine sensors 10A through 10n via engine signal lines 38 by engine interface control device 40. The components of engine interface control device 40 are not shown in detail since they are almost identical to chassis interface section 26. The engine sensor signals (carrying engine sensor data information) are first conditioned by signal conditioning circuitry, then multiplexed, to A/D convertor for input to a microprocessor. An engine control signal (containing engine sensor data and identity information associated together by a microprocessor) is then transmitted downstream to gauges 14 via a data bus interface. In addition to processing the engine sensor signals, engine interface control device 40 allows downstream components to be connected to control the operation of engine functions to maximize fuel efficiency.

The control signals from engine interface control device 40 are carried by data bus 44 to data control device 46. The control signals from chassis interface section 26 are resident in data control device 46, since section 26 is part of data control device 46. In addition to controlling chassis interface section 26, microprocessor 34 processes the control signals and the sensor data information and sensor identity information contained therein. Data control device 46 receives the control signals transmitted from engine interface control device 40 along engine data bus 44 via data bus interface 36. Microprocessor 34 controls data control device 46 functions based on instructions stored in memory device 35.

Data control device 46 functions as both a data traffic cop and data processor. Sensor data information and identity information are received by data control device 46. Then, data control device 46 organizes, prioritizes and transmits the sensor data information using interface 36 to gauges 14 along a single common data bus 48. Data control device 46 is capable of distributing the sensor information either identically to gauges 14 in the vehicle dashboard along one data bus or selectively along a plurality of data buses. However, the preferred embodiment utilizes single common data bus 48 to minimize the number of wires coupled to the back of the vehicle dashboard and to provide the maximum flexibility in displaying engine and chassis sensor data information on the vehicle dashboard.

Data control device 46 functions as a data processor by further processing the sensor data information and the identity information. The control signals received from engine interface control device 40 and chassis interface section 26 are essentially the voltage level or frequency received from sensors 10 in digital form along with the identity of the corresponding sensor 10. The sensor data information signal must be converted to a code recognizable by gauges 14. Data control device 46 performs this conversion. However, it would be obvious to one of ordinary skill that this process could be accomplished, in part or in whole, by other control devices 12, sensors 10 or modules 20 formed to make the conversion, or this process may be shared by any combination of control devices 12, sensors 10 and modules 20.

The preferred embodiment concentrates the conversion function in data control device 46 for the convenience of using a centralized location. However, in the event of a failure in data control device 46, the other control devices and modules 14 contain the necessary instructions in the associated memory devices to carry out the necessary functions. Moreover, all of the functions of chassis interface section 26, engine interface control device 40 and data control device 46 could be combined into a single control device. The preferred embodiment allows sensors 10 to be located close to the control devices and efficiently utilizes the electronic engine control units that will be standard in most trucks.

All sensor information input to data control device 46 is transmitted as an output of control device 46 in the form of control signals. Each and every universal module 20 along common data bus 48 receives all of the control signal outputs from control device 46 in the preferred embodiment. It is possible to divide the modules and thus control signals into groups, e.g., modules for displaying engine sensor data information and modules for displaying chassis sensor data information. However, this would increase the number of wires leading into the dashboard. The problem could be partially alleviated by using a data switch to direct data along different data bus branches (not shown) dependent on the associated identity information.

As shown in FIG. 3, universal module 20 receives the control signal from data bus 48 via data bus interface 50 which in turn is coupled to microprocessor 52. Data and instructions for operation of microprocessor 52 are contained in memory device 53. Dependant on the sensor data information to which microprocessor 52 responds, air core meter 54 and warning indicator 56 display the transmitted data.

In order to display sensor data information transmitted along data bus 48, each universal module 20 must be instructed which sensor's data it is supposed to display. The selection of sensor data displayed is made by coupling a particular desired scale plate 58 (generically referred to as a module overlay) to a particular universal module 20. Since each universal module 20 is identical, scale plate 58, shown in FIG. 4, establishes an identity for the universal module 20 to which it is attached. This identity corresponds to a particular sensor's identity and thus module 20 will respond to a particular sensor 10. The identity information or address is contained on scale plate 58 in the form of encoding holes 62 which are read by universal module 20 to obtain the necessary identity information or address code for the module.

Encoding holes 62 function as identification means 22. Alternatively, encoding holes 62 could be coupled to universal modules 20 independent of scale plate 58. Also, an alternate form of identification means 22 could be substituted for encoding holes 62 such as conductive encoding strips, selectable dip switches added to universal modules 20. Finally, identification means 22 could be incorporated into memory device 53 which could be programmed with the necessary identification information, however this would require reprogramming any time a universal module 20 need to respond to a different sensor 10.

Referring back to FIG. 4, the scale plate 58 might be used for display of oil pressure, i.e., indicia 66 can be provided which corresponds to oil pressure data, and the identity information in encoding holes 62 corresponds to an oil pressure sensor's identity information. This combination is shown in FIG. 1 as gauge 14B with overlay 22B to produce module 20B. Module 20B is programmed by overlay 22B to select the necessary instructions and data from memory device 53 (FIG. 3) and to read control signals on data bus 48 looking for identification information in the control signal indicating that the associated data information signal is from the oil pressure sensor 10B. When gauge 14B reads oil pressure identity information data, it will read in the associated data information signal, perform the necessary scaling and drive meter 54 to display oil pressure data. Alternatively, the necessary scaling could be performed by data control device 46.

Scale plate 58 is shown in FIG. 4 with indicia 66 (including numbers and/or markings) for providing a scale to indicate engine oil pressure. Indicia 66 are the same type and configuration normally used on standard gauges. As a result, the present invention can be employed in a manner transparent to the driver of the vehicle. Alternatively, memory device 53 also can be used to create the scaling for the display, for example, a liquid crystal display, in which case overlay 58 need not have scaling indicia on it.

Also shown in FIG. 4 are encoding holes 62 on flexible tab 63 which represent the identity or address code of scale plate 58. The particular code is determined by the presence or absence of encoding holes 62 at locations 70. Encoding holes 62 are detected by a spring clip reader (not shown) with cones for protruding through encoding holes 62. If an encoding hole 62 is present, the cone will pass through flexible tab 63 to complete a circuit. If no encoding hole 62 is present, the cone will not be able to complete its circuit.

This allows each designated location 70 on scale plate 58 to generate one bit of data for forming the identity or address code. By way of example, scale plate 58 in FIG. 4 contains five designated locations 70 for encoding holes 62. If the presence of an ending strip is designated as a "high" or "1" bit value, the locations 70 in FIG. 4, reading from left to right, represents the following five bit binary code: "10110." Since indicia 66 on scale plate 58 in FIG. 4, corresponds to oil pressure, the code "10110" is the necessary address code to cause any module 20 to read and display oil pressure sensor data.

In an alternate embodiment, scale plate 58 provides the identity information for universal module 20 via an elastomer circuit which contacts conductive encoding strips on scale plate 58. The encoding strips are made of a conductive material, such as beryllium copper, silk screened or transfer printed onto scale plate 58 so that the elastomer circuit when in contact with scale plate 58 can determine the presence of an encoding strip at a particular location 70 or lack thereof. Also, the encoding strips could communicate optically instead of electrically.

As shown in FIG. 5, scale plate 58 is connected to air core gauge movement face 72, which protrudes through scale plate slot 76 on scale plate 58, so pointer 74 can point to indicia 66 on scale plate 58. Flexible tab 63 is bent to extend through slot 77 in movement face 72 and into the spring clip reader on board 82. The identity code read by the spring clip reader is input via electrical leads 80 to microprocessor 52 on circuit board 82. Board 82, air core meter 54, movement face 72 and scale plate 58, in successive order, snap into standard gauge housing or can 84 and are covered by a glass window 86 which twists onto standard gauge can 84. All of these components are held in the dashboard display by slide-on clamp 88 which slides over gauge can 84.

Air core meters 54 are identical so that all will respond in the same manner to the same signal, i.e., the same voltage or the same pulse width modulated signal will drive pointer 74 coupled to air core meter 54 to the same level. Therefore, the sensor data information received by universal module 20 from data control device 46 must be converted to a particular voltage level or pulse width delay to move pointer 74 to the proper position with respect to indicia 66 or the gauge's scaling. Microprocessor 52 must apply a different algorithm from memory device 53 to determine the voltage or pulse width depending on the sensor 10 to which it is responding. Thus, the identity code received from encoding holes 62 dictates to microprocessor 52 which algorithm to apply as well as which sensor data information to select from data bus 48. The selected data received from data control device 46 functions as a parameter which microprocessor 52 uses in conjunction with the corresponding algorithm. A look-up table could be used and stored in memory device 53 in place of algorithms, however algorithms are less memory intensive.

Microprocessor 34 determines whether the selected sensor data indicates sensor 10 is measuring a critical level. If so, data control device 46 transmits the data necessary to cause microprocessor 52 to illuminate warning indicator 56. In order to enhance the usefulness of the warning indicator, the microprocessor will cause warning indicator 56 to flash rapidly as the critical level is approached which helps grab the attention of the vehicle driver. The warning indicator can be constantly illuminated once the critical level is reached.

It would be apparent to one of ordinary skill that gauge 14 can display a wide variety of information in response to the sensor data. Microprocessor 52 provides this flexibility, since it can be programmed to process the sensor data as desired.

The distributed processing employed by the present invention provides built in redundancy. Since all of the control devices 12 and universal modules 20 are microprocessor based, each microprocessor can perform many of the digital processing tasks of the other microprocessors. In the preferred embodiment, the digital processing tasks are concentrated in data control device 46 in order to maintain more centralized processing. However, many of these tasks could be distributed throughout the system.

From the above description, it will be apparent that the invention disclosed herein provides a novel and advantageous monitoring system which is particularly advantageous when employed in vehicle applications. The foregoing discussion discloses and describes merely exemplary methods and embodiments of the present invention. One skilled in the art will readily recognize from such discussion that various changes, modifications and variations may be made therein without departing from the spirit and scope of the invention. Accordingly, the disclosure of the present invention is intended to be illustrative, but not limiting, of the scope of the invention, which is set forth in the following claims.

We claim:

1. A monitoring system for monitoring a plurality of functions and conditions, said monitoring system comprising:

a plurality of sensors each producing a sensor signal in response to sensing of one of a function and condition;

a control device coupled to said plurality of sensors and producing a control signal responsive to each of said sensor signals, said control signal including sensor data information and sensor identity information identifying each of said plurality of sensors;

a plurality of display modules each being programmable and each being coupled to said control device; and a plurality of module overlays with one of said plurality of module overlays being coupled to each of said plurality of display modules, each of said plurality of module overlays having module identification means communicating with the display module on which said overlay is coupled to program said display module to be responsive to said control signal when said sensor identity information in said control signal corresponds to said module identification means to cause said display module to displays said sensor data information in said control signal.

2. The monitoring system as recited in claim 1, wherein said display module includes a memory for storing data and information enabling said display module to display said sensor information corresponding to any of said plurality of sensors.

3. The monitoring system as recited in claim 1, wherein said identification means comprise encoding holes arranged on said plurality of module overlays in a pattern unique to each of said plurality of sensors.

4. The monitoring system as recited in claim 1, wherein said identification means comprise conducting members arranged on said plurality of module overlays in a pattern unique to each of said plurality of sensors.

5. The monitoring system as recited in claim 1, wherein said sensors are mounted to a vehicle to sense functions and conditions of said vehicle; said plurality of display modules are coupled to said control device by a common data bus; and each of said module overlays includes display indicia for display of information corresponding to one of said plurality of sensors.

6. A gauge for displaying any one of a plurality of types of sensor data information contained in a sensor signal having sensor identity information associated with said sensor data information, said gauge comprising:
   a display module being programmable and being formed for coupling to said plurality of sensors; and
   a module overlay being coupled to said display module and having module identification mean communicating with said display module to program said display module to be responsive to said sensor identity information in a sensor signal to cause said display module and module overlay to display said sensor data information associated with said sensor identity information.

7. The gauge as recited in claim 6, wherein said display module includes a memory for storing data and information enabling said display module in response to said identification means to display said particular type of said sensor data information.

8. The gauge as recited in claim 6, wherein said identification means comprises encoding holes arranged on said module overlay in a pattern unique to the corresponding sensor.

9. The gauge as recited in claim 6, wherein said identification means comprises conducting encoding members arranged on said module overlay in a pattern unique to the corresponding sensor.

10. The gauge as recited in claim 6, wherein said module overlay includes display indicia for display of sensor data information corresponding to the one of said sensors identified by said module identification means.

11. A method for monitoring a plurality of functions and conditions, comprising the steps of:
    providing a plurality of sensors each producing a sensor signal in response to sensing of one of a function and a condition;
    producing a control signal in response to each of the sensor signals, said control signal including sensor data information and associated sensor identity information identifying said sensor from which said sensor data information was generated;
    transmitting said control signal to a plurality of display modules each being programmable and each having one of a plurality of module overlays coupled thereto having module identification means programming said display module to be responsive to said sensor identity information in said control signal corresponding to said module identification information; and
    displaying said sensor data information associated with said sensor identity information on said display module.

12. The method as defined in claim 11 wherein, said transmitting step is accomplished by transmitting said control signals to a plurality of said display modules along a common data bus.

* * * * *

UNITED STATES PATENT AND TRADEMARK OFFICE
CERTIFICATE OF CORRECTION

PATENT NO. : 5,432,497
DATED : July 11, 1995
INVENTOR(S) : Briski et al.

It is certified that error appears in the above-indentified patent and that said Letters Patent is hereby corrected as shown below:

On title page item [75], delete "Dennsi" and insert --Dennis--.

Signed and Sealed this

Twelfth Day of September, 1995

Attest:

BRUCE LEHMAN

*Attesting Officer*            *Commissioner of Patents and Trademarks*